(12) United States Patent
Peterson

(10) Patent No.: US 10,458,470 B2
(45) Date of Patent: Oct. 29, 2019

(54) COMPACT BEARING ASSEMBLIES INCLUDING SUPERHARD BEARING SURFACES, BEARING APPARATUSES, AND METHODS OF USE

(71) Applicant: US SYNTHETIC CORPORATION, Orem, UT (US)

(72) Inventor: S. Barrett Peterson, Orem, UT (US)

(73) Assignee: US SYNTHETIC CORPORATION, Orem, UT (US)

(*) Notice: Subject to any disclaimer, the term of this patent is extended or adjusted under 35 U.S.C. 154(b) by 0 days.

(21) Appl. No.: 16/291,892

(22) Filed: Mar. 4, 2019

(65) Prior Publication Data

US 2019/0195279 A1 Jun. 27, 2019

Related U.S. Application Data

(63) Continuation of application No. 15/217,551, filed on Jul. 22, 2016, now Pat. No. 10,260,560, which is a (Continued)

(51) Int. Cl.
*F16C 33/04* (2006.01)
*F16C 17/02* (2006.01)
(Continued)

(52) U.S. Cl.
CPC ............ *F16C 33/043* (2013.01); *E21B 4/003* (2013.01); *F01D 25/16* (2013.01); *F02C 7/06* (2013.01);
(Continued)

(58) Field of Classification Search
CPC .......... E21B 4/003; E21B 10/22; E21B 10/23; F01D 25/16; F01D 25/162; F01D 25/166;
(Continued)

(56) References Cited

U.S. PATENT DOCUMENTS 1,983,283 A * 12/1934 Garfield .................. E21B 10/08
384/96
2,086,681 A * 7/1937 Scott ....................... E21B 10/22
384/95

(Continued)

FOREIGN PATENT DOCUMENTS

EP 0392500 10/1990
GB 2054064 2/1981

OTHER PUBLICATIONS

U.S. Appl. No. 13/791,944, filed Feb. 7, 2013, Peterson et al.
(Continued)

*Primary Examiner* — Alan B Waits
(74) *Attorney, Agent, or Firm* — Dorsey & Whitney LLP

(57) ABSTRACT

Embodiments of the invention are directed to compact bearing assemblies configured to operate in small spaces and/or in harsh environments, bearing apparatuses including such bearing assemblies, and method of operating such bearing assemblies and apparatuses. For instance, one or more compact bearing assemblies may at least partially rotatably secure a shaft of a power generation unit to a housing thereof. Also, a first compact bearing assembly may connect or couple to the shaft and may rotatably engage a second compact bearing assembly, which may be connected or otherwise secured to the housing.

17 Claims, 12 Drawing Sheets

Related U.S. Application Data continuation-in-part of application No. 14/097,059, filed on Dec. 4, 2013, now Pat. No. 9,410,576.

(51) Int. Cl.

| | | |
|---|---|---|
| *F16C 17/10* | (2006.01) | |
| *E21B 4/00* | (2006.01) | |
| *F02C 7/06* | (2006.01) | |
| *F16C 33/10* | (2006.01) | |
| *F16C 32/06* | (2006.01) | |
| *F01D 25/16* | (2006.01) | |
| *F16C 17/26* | (2006.01) | |

(52) U.S. Cl.
CPC ............ *F16C 17/02* (2013.01); *F16C 17/026* (2013.01); *F16C 17/107* (2013.01); *F16C 17/26* (2013.01); *F16C 32/0633* (2013.01); *F16C 32/0666* (2013.01); *F16C 33/107* (2013.01); *F05D 2300/605* (2013.01); *F16C 2206/04* (2013.01); *F16C 2206/40* (2013.01); *F16C 2206/82* (2013.01); *F16C 2220/20* (2013.01); *F16C 2240/60* (2013.01); *F16C 2352/00* (2013.01)

(58) Field of Classification Search
CPC .... F01D 25/168; F05D 2300/606; F02C 7/06; F16C 17/02; F16C 17/026; F16C 17/10; F16C 17/107; F16C 17/26; F16C 33/043; F16C 33/107; F16C 33/26; F16C 32/0633; F16C 32/0666; F16C 2206/04; F16C 2206/40; F16C 2206/82; F16C 2220/20; F16C 2240/60; F16C 2352/00
See application file for complete search history.

(56) References Cited

U.S. PATENT DOCUMENTS

| | | | | |
|---|---|---|---|---|
| 2,507,776 | A * | 5/1950 | Francis | E21B 10/22 384/92 |
| 2,595,903 | A * | 5/1952 | Swart | E21B 10/22 384/95 |
| 2,602,714 | A | 7/1952 | Wheildon, Jr. et al. | |
| 3,299,973 | A * | 1/1967 | Swart | E21B 10/246 175/371 |
| 3,476,446 | A * | 11/1969 | Neilson | E21B 10/22 175/371 |
| 3,866,987 | A * | 2/1975 | Garner | E21B 10/22 175/371 |
| 4,136,748 | A * | 1/1979 | Dickerhoff | E21B 10/22 175/337 |
| 4,190,301 | A * | 2/1980 | Lachonius | E21B 10/22 384/95 |
| 4,194,794 | A * | 3/1980 | Kling | E21B 10/22 175/17 |
| 4,206,952 | A * | 6/1980 | Olschewski | E21B 10/22 384/902 |
| 4,248,485 | A * | 2/1981 | White | E21B 10/22 384/282 |
| 4,260,203 | A * | 4/1981 | Garner | E21B 10/22 384/96 |
| 4,270,812 | A * | 6/1981 | Thomas | E21B 10/22 175/371 |
| 4,451,162 | A * | 5/1984 | Shepherd | E21B 10/22 384/95 |
| 4,549,820 | A * | 10/1985 | Mullins | E21B 10/22 384/95 |
| 4,560,014 | A * | 12/1985 | Geczy | E21B 4/003 175/107 |
| 4,625,816 | A * | 12/1986 | Takano | E21B 10/22 175/371 |
| 4,756,631 | A * | 7/1988 | Jones | E21B 10/22 175/359 |
| 4,825,964 | A * | 5/1989 | Rives | E21B 10/25 175/359 |
| 5,655,611 | A * | 8/1997 | Dolezal | E21B 10/25 175/371 |
| 5,868,502 | A * | 2/1999 | Cariveau | E21B 10/22 384/93 |
| 6,068,070 | A * | 5/2000 | Scott | E21B 10/22 175/428 |
| 6,206,110 | B1 * | 3/2001 | Slaughter, Jr. | E21B 10/003 175/227 |
| 6,250,407 | B1 * | 6/2001 | Karlsson | E21B 10/22 175/331 |
| 7,559,381 | B2 * | 7/2009 | Lin | E21B 10/22 175/372 |
| 7,866,418 | B2 | 1/2011 | Bertagnolli et al. | |
| 7,998,573 | B2 | 8/2011 | Qian et al. | |
| 8,034,136 | B2 | 10/2011 | Sani | |
| 8,236,074 | B1 | 8/2012 | Bertagnolli et al. | |
| 8,337,085 | B2 * | 12/2012 | Nagaraj | E21B 10/22 175/371 |
| 8,834,026 | B2 * | 9/2014 | Flores | E21B 10/23 175/371 |
| 9,410,576 | B2 | 8/2016 | Peterson | |
| 2001/0006124 | A1 * | 7/2001 | Saxman | E21B 10/24 175/228 |
| 2001/0042644 | A1 * | 11/2001 | Nishiyama | E21B 10/22 175/371 |
| 2004/0031625 | A1 * | 2/2004 | Lin | E21B 10/25 175/371 |
| 2005/0152627 | A1 | 7/2005 | Ku et al. | |
| 2007/0284150 | A1 * | 12/2007 | Lin | E21B 10/22 |
| 2009/0205873 | A1 * | 8/2009 | Dick | E21B 10/22 175/371 |
| 2012/0012401 | A1 * | 1/2012 | Gonzalez | B24D 99/005 175/428 |
| 2012/0037425 | A1 * | 2/2012 | Sexton | E21B 4/003 175/57 |
| 2012/0080230 | A1 | 4/2012 | Flores et al. | |
| 2012/0225253 | A1 * | 9/2012 | DiGiovanni | F16C 33/26 428/161 |
| 2013/0156357 | A1 | 6/2013 | Peterson et al. | |
| 2013/0199693 | A1 * | 8/2013 | Tank | B05B 1/00 175/371 |
| 2015/0152915 | A1 | 6/2015 | Peterson | |
| 2016/0327088 | A1 | 11/2016 | Peterson | |

OTHER PUBLICATIONS

U.S. Appl. No. 14/097,059, filed Dec. 4, 2013, Peterson.
U.S. Appl. No. 15/217,551, filed Jul. 22, 2016, Peterson.
International Search Report and Written Opinion from International Application No. PCT/US2014/067711 dated Feb. 3, 2015.
U.S. Appl. No. 14/097,059, Nov. 3, 2014, Office Action.
U.S. Appl. No. 14/097,059, Mar. 27, 2015, Office Action.
U.S. Appl. No. 14/097,059, Oct. 5, 2015, Office Action.
U.S. Appl. No. 14/097,059, Apr. 12, 2016, Notice of Allowance.
U.S. Appl. No. 14/097,059, Jul. 20, 2016, Issue Notification.
U.S. Appl. No. 15/217,551, Sep. 11, 2017, Office Action.
U.S. Appl. No. 15/217,551, Feb. 16, 2018, Office Action.
U.S. Appl. No. 15/217,551, Apr. 26, 2018, Advisory Action.
U.S. Appl. No. 15/217,551, Jun. 12, 2018, Office Action.
U.S. Appl. No. 15/217,551, Dec. 10, 2018, Notice of Allowance.

* cited by examiner

COMPACT BEARING ASSEMBLIES INCLUDING SUPERHARD BEARING SURFACES, BEARING APPARATUSES, AND METHODS OF USE

CROSS-REFERENCE TO RELATED APPLICATIONS

This application is a continuation of U.S. application Ser. No. 15/217,551 filed on 22 Jul. 2016, which is a continuation-in-part of U.S. application Ser. No. 14/097,059 filed on 4 Dec. 2013 (now U.S. Pat. No. 9,410,576), the disclosure of each of which is incorporated herein, in its entirety, by this reference.

BACKGROUND

Subterranean drilling systems can employ various tools that require electrical power. In some instances, a drilling system includes a power generation unit. Fluid, such as drilling fluid, may flow through a turbine of the power generation unit, thereby producing rotation of a shaft, which may be converted into electrical power (e.g., the power generation unit may drive an alternator). Bearing apparatuses (e.g., thrust, radial, tapered, and other types of bearings) also may be operably coupled to the shaft and may assist in maintaining the shaft in a substantially stationary lateral and/or axial position, for instance, relative to a housing, while allowing the shaft to rotate.

A typical bearing apparatus includes a stator that does not rotate and a rotor that is attached to the shaft and rotates with the shaft. The operational lifetime of the bearing apparatuses often determines the useful life of the power generation unit as well as of the subterranean drilling system. Therefore, manufacturers and users of subterranean drilling systems and power generation units continue to seek improved bearing apparatuses to extend the useful life of such bearing apparatuses.

SUMMARY

Embodiments of the invention are directed to compact bearing assemblies configured to operate in small spaces and/or in harsh environments, bearing apparatuses including such bearing assemblies, and methods of operating such bearing assemblies and apparatuses. For instance, one or more compact bearing assemblies may at least partially rotatably secure a shaft of a power generation unit to a housing thereof. In an embodiment, a first compact bearing assembly may connect or couple to the shaft and may rotatably engage a second compact bearing assembly, which may be connected or otherwise secured to the housing. Furthermore, when engaged with one another, the first and second compact bearing assemblies may have limited or no lateral movement relative to one another. Hence, a bearing apparatus that may include the first and second bearing assemblies may rotatably secure the shaft to the housing, while limiting lateral movement of the shaft relative to the housing.

An embodiment includes a bearing apparatus including a first bearing assembly and a second bearing assembly. The first bearing assembly includes a first support structure. The first bearing assembly further includes a first superhard body secured to the first support structure and protruding above a top surface thereof and defining a convex radial-bearing surface. The second bearing assembly includes a second superhard body secured within the recess. In addition, the second superhard body includes an opening defined by a concave radial-bearing surface that is sized and configured to rotatably engage the first radial-bearing surface.

In another embodiment, a bearing apparatus includes a first bearing assembly having a first support structure including a top surface, a first substrate secured to the first support structure, and a first superhard body bonded to the first substrate at an interface therebetween and protruding above the top surface of the support structure. The first superhard body defines a convex radial-bearing surface and a top surface. At least a portion of the first superhard body exhibiting a thickness of about 0.25 inches to about 0.50 inches. The bearing apparatus further includes a second bearing assembly including a second superhard body including an opening defined by a concave radial-bearing surface. The concave radial bearing surface is sized and configured to engage the convex radial-bearing surface of the first superhard body.

Embodiments also include a power generation unit including a housing and a first bearing assembly attached to the housing. The first radial bearing assembly includes a first single superhard body that defines a first radial-bearing surface. The power generation unit also includes a shaft rotatably secured within the housing in a manner that flow of fluid through the power generation unit produces rotation of the shaft. Furthermore, the power generation unit includes a second bearing assembly attached to the shaft. The second bearing assembly includes a second single superhard body that defines a second radial-bearing surface, the second radial-bearing surface being rotatably engaged with the first radial-bearing surface. In addition, the power generation unit includes an alternator operably connected to the shaft.

Another embodiment is directed to a method of rotating a shaft within a housing. The method includes attaching a first bearing assembly to the shaft and attaching a second bearing assembly to the housing. Additionally, the method includes positioning a first radial-bearing surface of the first bearing assembly inside an opening defined by a second radial-bearing surface of the second bearing assembly. Moreover, one or more of the first radial-bearing surface or the second radial-bearing surface include superhard material. The method also includes forming a fluid film between the first radial-bearing surface and the second radial-bearing surface during the rotation of the shaft within the housing, thereby producing hydrodynamic operation between the first radial-bearing surface and the second radial-bearing surface.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
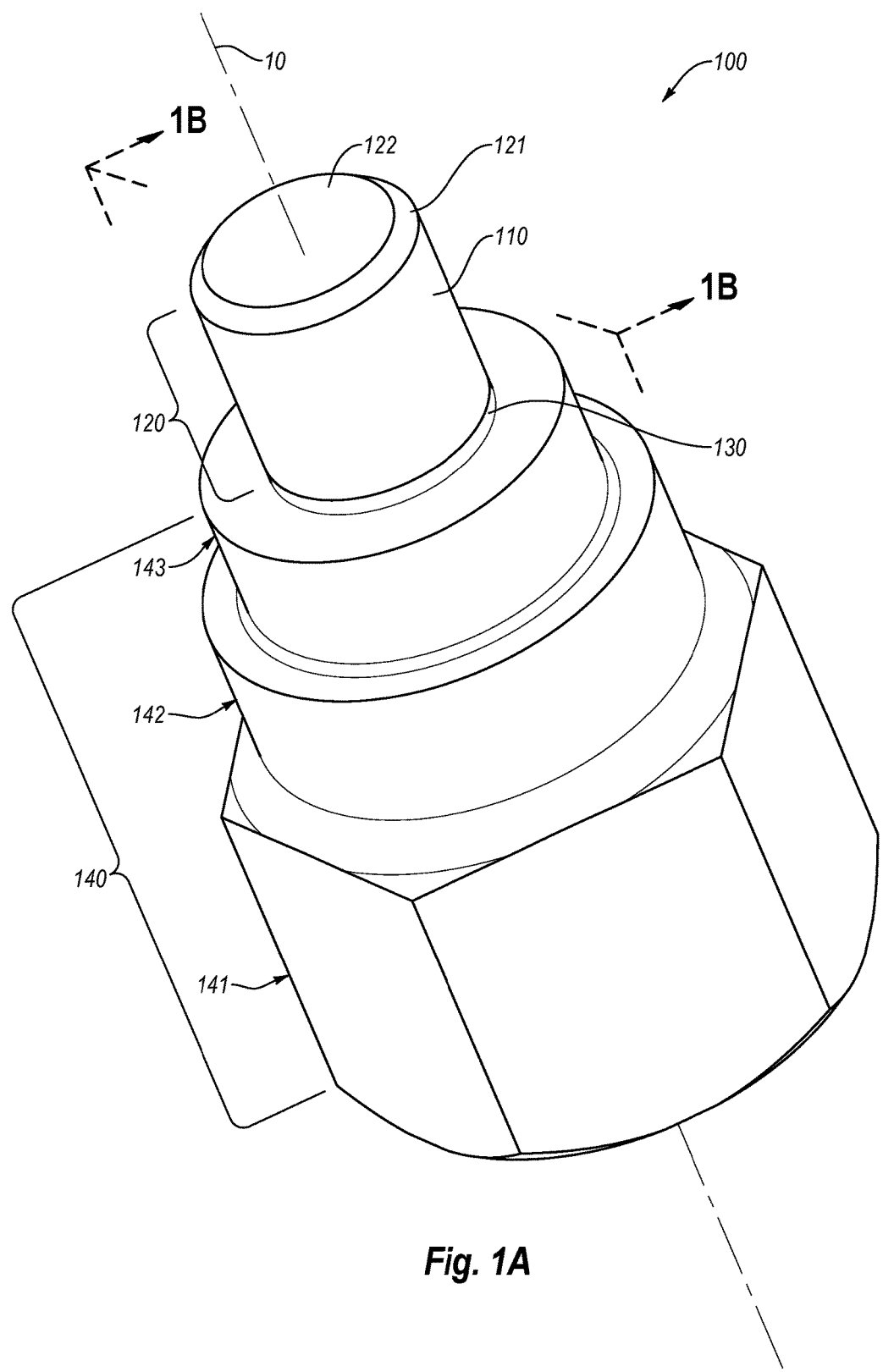
FIG. 1A is an isometric view of a first bearing assembly according to an embodiment.

Embodiments of the invention are directed to compact bearing assemblies configured to operate in small spaces and/or in harsh environments, bearing apparatuses including such bearing assemblies, and method of operating such bearing assemblies and apparatuses. For instance, one or more compact bearing assemblies may at least partially rotatably secure a shaft of a power generation unit to a housing thereof. In an embodiment, a first compact bearing assembly may connect or couple to the shaft and may rotatably engage a second compact bearing assembly, which may be connected or otherwise secured to the housing. Furthermore, when engaged with one another, the first and second compact bearing assemblies may have limited or no lateral movement relative to one another. Hence, a bearing apparatus that may include the first and second bearing assemblies may rotatably secure the shaft to the housing, while limiting lateral movement of the shaft relative to the housing.

In an embodiment, one of the first bearing assembly and the second bearing assembly may include a protrusion that may have a convex substantially cylindrical bearing surface, while the other of the first and second bearing assemblies may include an opening defined by a concave substantially cylindrical bearing surface that may rotatably engage the protrusion. As such, the first bearing assembly may rotate relative to the second bearing assembly, as described above. In additional or alternative embodiments, the first and/or the second bearing assembly may include superhard material that may form or define at least a portion of the bearing surfaces thereof. For example, the first and/or second bearing assembly may include a superhard body bonded to a substrate. The respective superhard bodies may include superhard material that forms/defines bearing surfaces of the first and second bearing assemblies.

In some embodiments, the first bearing assembly may include a superhard body that protrudes away from the support structure, thereby forming a protrusion with a convex bearing surface that may enter and/or engage the second bearing assembly. For example, the second bearing assembly may include an interior surface that may form/define a concave bearing surface of the second bearing assembly. For example, the protrusion of the first bearing assembly may enter an opening in the second bearing assembly and may engage the bearing surface of the second bearing assembly.

Furthermore, as noted above, in an embodiment, the respective bearing surfaces of the first and second bearing assemblies may be formed/defined by superhard material (e.g., superhard material of respective superhard bodies). As such, the bearing surface defined or formed by the opening in the second bearing assembly may include superhard material. In an embodiment, the superhard material may be a body of superhard material mounted on or within the support structure. Such superhard body may form a hole or an opening that may rotatably at least partially engage the protrusion of the first bearing assembly.

Also, in some embodiments, the first bearing assembly may be a rotor, while the second bearing assembly may be a stator (e.g., the second bearing assembly may be substantially stationary relative to a housing or other machine component, while the first bearing assembly may rotate together with the shaft) or vice versa. In any event, at least a portion of a protrusion of the first bearing assembly may rotatably at least partially engage an opening in the second bearing assembly in a manner that allows the first and second bearing assemblies to rotate relative to each other, while preventing or limiting lateral movement thereof.

Figure 1B:
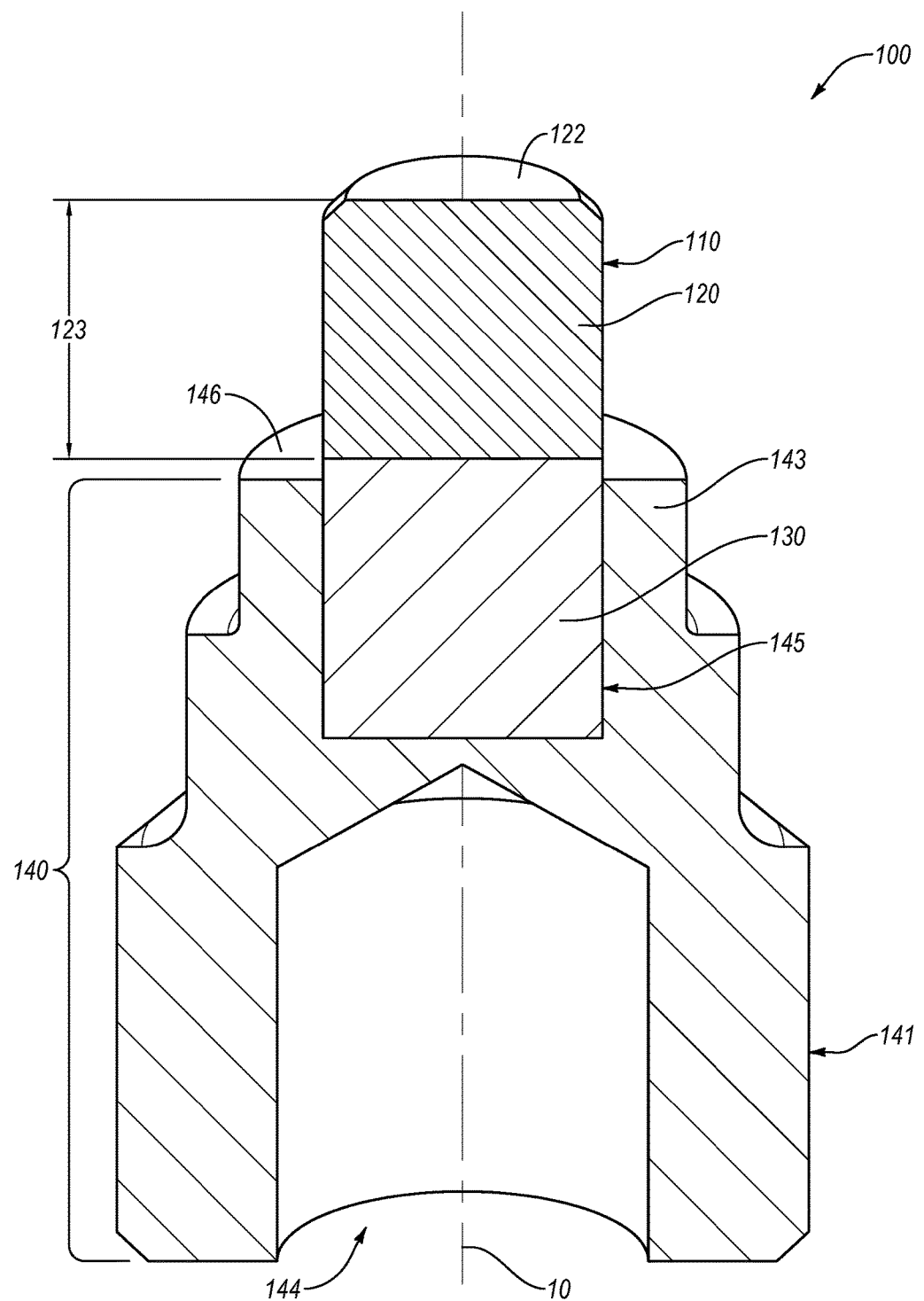
FIG. 1B is a cross-sectional view of the first bearing assembly of FIG. 1A.
Figure 1C:
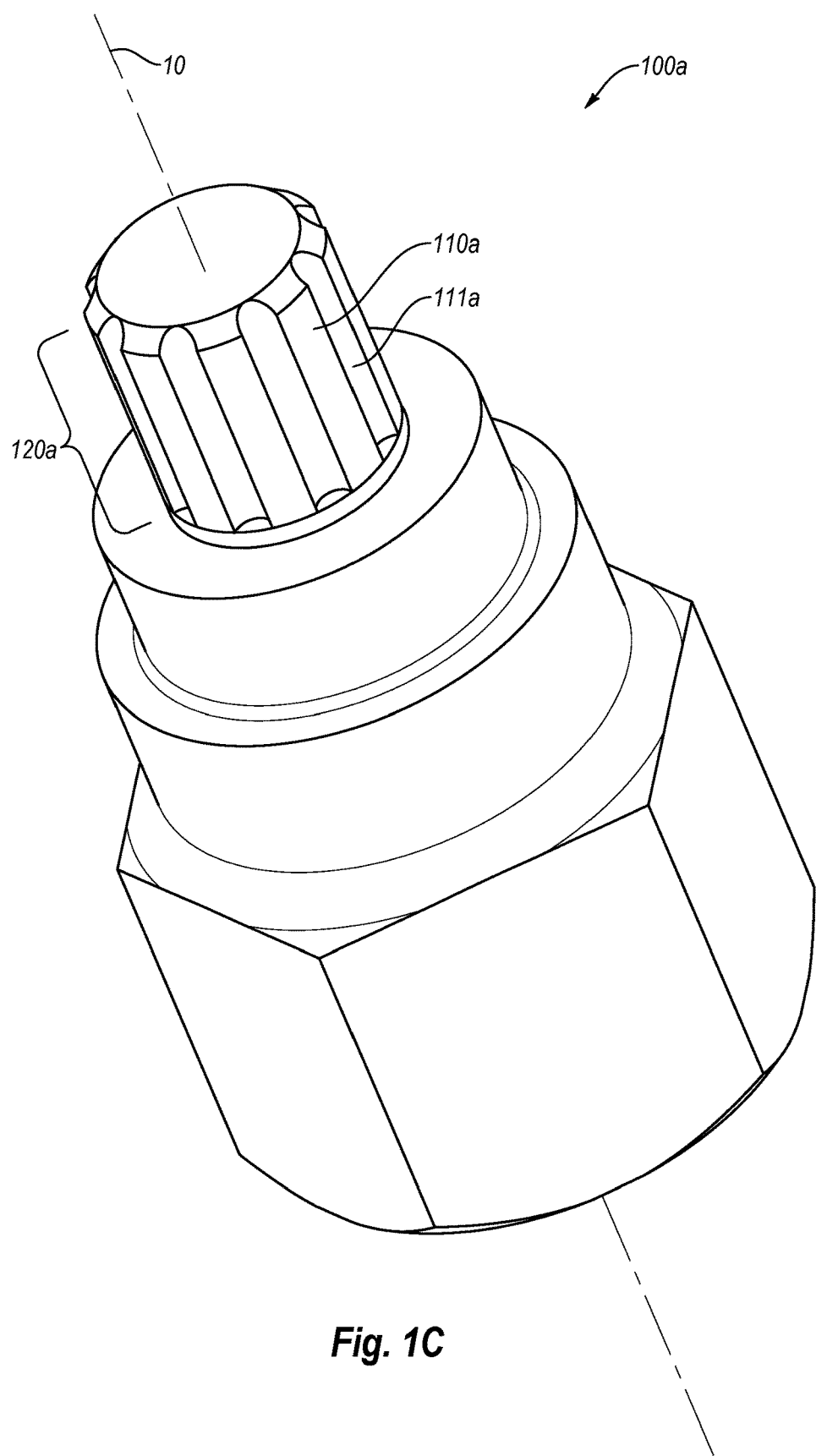
FIG. 1C is an isometric view of a first bearing assembly according to another embodiment.

FIGS. 1A-1C illustrate an embodiment of a first bearing assembly 100. The first bearing assembly 100 may include a first radial-bearing surface 110, which may at least partially engage a corresponding bearing surface of the second bearing assembly, as described below in more detail.

In an embodiment, the first radial-bearing surface 110 may be convex and approximately cylindrical. Furthermore, in some instance, the first radial-bearing surface 110 may be substantially continuous or uninterrupted. Accordingly, rotation of the first radial-bearing surface 110 about an axis 10 may cause the first radial-bearing surface 110 to be in at least partial contact with the opposing bearing surface of the second bearing assembly. Alternatively, however, the first radial-bearing surface 110 may be discontinuous and/or interrupted (e.g., the first radial-bearing surface 110 may include groove).

Additionally, the first radial-bearing surface 110 may include superhard material, such that the first radial-bearing surface 110 may exhibit a hardness that is at least as hard as tungsten carbide. In any of the embodiments disclosed herein, the superhard material may include one or more of polycrystalline diamond, polycrystalline cubic boron nitride, silicon carbide, tungsten carbide, or any combination of the foregoing superhard materials.

For instance, the first bearing assembly 100 may have a superhard body 120 that may include the first radial-bearing surface 110. Particularly, a peripheral surface of the superhard body 120 may form/define the first radial-bearing surface 110. In addition, the superhard body 120 may include a chamfer 121 extending between the first radial-bearing surface 110 and a top surface 122 of the superhard body 120. Under some operating conditions, the chamfer 121 may prevent or eliminate chipping of the superhard body 120 that may, otherwise, affect continuity of the first radial-bearing surface 110.

In an embodiment, the superhard body 120 may be bonded to a substrate 130, which may be secured to a support structure 140. The support structure 140 may have any suitable shape, which may vary from one embodiment to the next. In an embodiment, the support structure 140 may have a generally cylindrical shape. Moreover, the support structure 140 may include multiple sections connected together or integrated with one another, such as sections 141, 142, and 143. Thickness of each section (as measured along the axis 10) as well as the overall thickness of the support structure 140 may vary one embodiment to another, and may depend on a particular application and load experienced by the support structure 140, among other factors or considerations.

Similarly, as mentioned above, the shapes of the sections 141, 142, 143 may vary depending on particular application of the first bearing assembly 100. In some instances, the peripheral surface of the section 141 may have one or more flat or planar portions, which may facilitate engagement of a tool therewith (e.g., a wrench may engage the planar portions(s) in a manner that allows the tool to rotate the support structure 140 about the axis 10). For example the section 141 may be a hexagonal prismoid. Additionally or alternatively, the section 141 may have at least partially cylindrical shape (e.g., in high speed operation a cylindrical shape may improve balance of the first bearing assembly 100 and/or reduce vibration thereof). In any event, a tool may be used to hold and/or assemble the first bearing assembly 100 for operation (e.g., to rotate the first bearing assembly 100 such as to screw the first bearing assembly 100 onto a shaft).

In some embodiments, the sections 142, 143 may have approximately cylindrical shapes. Moreover, in an embodiment, the sections 142 and 143 may have dissimilar diameters and/or thicknesses. For example, the outside diameter of section 142 may be larger than the outside diameter of section 143. Moreover, in some instances, the section 143 may at least partially enter an opening in the second bearing assembly, while the section 142 may be larger than such opening. Likewise, the section 141 may be larger than section 142, such as to provide sufficient surface area for engaging a tool that may be used to secure the first bearing assembly 100 to a shaft (as discussed in greater detail hereinbelow).

Furthermore, in an embodiment, one, some, or all of the sections 141, 142, 143 may be generally concentric with one another. For instance, the sections 141, 142, 143 may be substantially centered about the axis 10. Alternatively, however, some or all of the sections 141, 142, 143 may be off-center relative to one another. In addition, one or more of the sections may include an opening, such as an opening 144 in the section 141, which may accept a shaft and/or a fastener that may secure the first bearing assembly 100 to a machine element or component.

As described above, the first bearing assembly 100 may include the superhard body 120 that may be bonded to the substrate 130. For example, the superhard body 120 may comprise polycrystalline diamond and the substrate 130 may comprise cobalt-cemented tungsten carbide. Other carbide materials may be used with tungsten carbide or as an alternative, such as chromium carbide, tantalum carbide, vanadium carbide, titanium carbide, or combinations thereof cemented with iron, nickel, cobalt, or alloys thereof. Furthermore, in any of the embodiments disclosed herein, the polycrystalline diamond body may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond body may be leached or otherwise at least partially removed to a selected depth from a bearing surface. Moreover, in any of the embodiments disclosed herein, the polycrystalline diamond may be unleached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond body. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard body 150*a* in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 70 µm, 60 µm, 50 µm, 40 µm, 30 µm, 20 µm, 15 µm, 12 µm, 10 µm, 8 µm) and another portion exhibiting at least one relatively smaller size (e.g., 15 µm, 12 µm, 10 µm, 8 µm, 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In another embodiment, the diamond particles may include a portion exhibiting the relatively larger size between about 15 µm and about 50 µm and another portion exhibiting the relatively smaller size between about 5 µm and about 15 µm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond or superabrasive body formed from HPHT sintering the aforementioned diamond particles may also exhibit the same or similar diamond grain size distributions and/or sizes as the aforementioned diamond particle distributions and particle sizes. Such polycrystalline diamond includes a plurality of diamond grains exhibiting diamond-to-diamond bonding (e.g., $sp^3$ bonding) therebetween and defining interstitial regions having a catalyst therein (e.g., a metal-solvent catalyst or carbonate catalyst). Other superabrasive/superhard materials may include a plurality of superabrasive grains bonded together to define interstitial regions having a catalyst therein. Additionally, in any of the embodiments disclosed herein, the superhard bearing elements may be free-standing (e.g., substrateless) and optionally may be at least partially leached or fully leached to remove a metal-solvent catalyst initially used to sinter the polycrystalline diamond body.

In some embodiments, the substrate 130 may be secured within the support structure 140. For example, the support structure 140 may include a recess 145 that can at least partially accommodate the substrate 130 therein. As such, at least a portion of the substrate 130 may be positioned and secured within the recess 145. In an embodiment, the recess 145 may be generally concentric with the opening 144. Hence, the recess 145 may generally concentrically locate the substrate 130 relative to the opening 144. For instance, the recess 145 may be centered about the axis 10.

Furthermore, the superhard body 120 may be generally concentric within the substrate 130. For example, the first radial-bearing surface 110 of the superhard body 120 may be centered about the axis 10. Thus, in one or more embodiments, the first radial-bearing surface 110 may be generally concentric with the opening 144, such that rotation of the shaft secured within the opening 144 may produce a rotation of the first bearing assembly 100 during which the first radial-bearing surface 110 rotates approximately concentrically within the support structure 140 and/or with the shaft.

In an embodiment, the recess 145 may be approximately cylindrical (i.e., may have an approximately circular cross-section). Likewise, the substrate 130 may have approximately cylindrical cross-section and may have a similar size to the recess 145. For example, the recess 145 may have sufficient clearance to accommodate the substrate 130 therein. The substrate 130 may be brazed, soldered, welded, fastened, press-fit, or otherwise secured to the support structure 140 (e.g., within the recess 145). It should be also appreciated that the recess 145 may have any suitable shape, which may vary from one embodiment to the next. Correspondingly, the substrate 130 also may have any suitable shape that may be mountable inside the recess 145. In any event, the superhard body 120 may be secured to or incorporated with the support structure 140. Thus, rotation of the first bearing assembly 100 may produce a corresponding rotation of the first radial-bearing surface 110, which may be approximately concentrically aligned with the axis of rotation of the shaft.

In some embodiments, the clearance between the recess 145 and the substrate 130 may be substantially small to allow final finishing of the first radial-bearing surface 110 before securing the substrate 130 within the recess 145. Additionally or alternatively, the substrate 130 may be first secured within the recess 145, and the first radial-bearing surface 110 may be finished (e.g., ground) thereafter. Similarly, in an embodiment, the top surface 122 of the superhard body 120 also may be finished after securing the substrate 130 in the recess 145. In an embodiment, the top surface 122 also may be unfinished or may be finished before securing the substrate 130 to the support structure 140.

In some embodiments, the substrate 130 may protrude above a top surface 146 (FIG. 1B) of the support structure 140. Alternatively, the substrate 130 may be entirely within the support structure 140, such that an interface between the substrate 130 and superhard body 120 may be located approximately in plane with top surface 146. In any case, in one or more embodiments, the superhard body 120 may be located entirely above the top surface 146 of the support structure 140. In other embodiments, the superhard body 120 may be partially located in the recess 145.

Referring still to FIG. 1B, in an embodiment, the superhard body 120 may have a thickness 123 (measured from the substrate 130 to the top surface 122) that is similar to or the same as the height of the substrate 130. For example, the thickness of the superhard body 120 may be approximately 0.25 inches, while the thickness of the substrate 130 may be between 0.23 inches to 0.27 inches. Additional examples of suitable thicknesses of the superhard body 120 and/or substrate 130 may include the following: about 0.05 inches to about 0.10 inches; about 0.08 inches to about 0.15 inches; about 0.12 inches to about 0.2 inches; about 0.18 inches to about 0.25 inches; about 0.20 inches to about 0.30 inches; or about 0.25 inches to about 0.50 inches. It should be appreciated that the superhard body 120 and/or substrate 130 may be thicker than 0.50 inches or thinner than 0.08 inches.

It should be appreciated that in some embodiments, the superhard body 120 may be bonded directly to the support structure 140. For example, the support structure 140 may comprise stainless steel and a substrateless superhard body 120 may be brazed, press-fitted, or otherwise attached directly to the support structure 140. Alternatively, the support structure 140 may comprise tungsten carbide, and the superhard body 120 may be bonded to the support structure 140 (e.g., using HPHT process described above). In any event, the first bearing assembly 100 may include the first radial-bearing surface 110, formed/defined by the superhard body 120, which may engage the corresponding second radial-bearing surface of the second bearing assembly.

Moreover, in an embodiment, the first bearing assembly 100 may include a thrust-bearing surface. In particular, the first radial-bearing surface 110 may carry a radial load, thereby preventing or limiting lateral movement of the shaft, for example, relative to the housing, while the thrust-bearing surface may prevent or limit axial movement of the shaft during rotation thereof. For instance, the top surface 146 of the support structure 140 may be a thrust-bearing surface and may engage an opposing or corresponding thrust-bearing surface of the second bearing assembly or of another (e.g., third) bearing assembly. Furthermore, the top surface 146 may include superhard material, such as polycrystalline diamond, which may be bonded or otherwise secured thereto.

As noted above, the first bearing assembly may include one or more grooves on a bearing surface thereof. For example, as illustrated in FIG. 1C, a first bearing assembly 100*a* may include a bearing surface 110*a* formed by a superhard body 120*a*, which includes a plurality of grooves 111*a*. Except as otherwise described below, the first bearing assembly 100*a* and its materials, elements, and components may be similar to or the same as materials, elements, or components of the first bearing assembly 100 (FIGS. 1A and 1B).

In an embodiment, the grooves 111*a* may be approximately parallel to the axis 10 and may be spaced and arranged thereabout. For instance, the grooves 111*a* may be evenly spaced about the bearing surface 110*a*, such that the distance between any two adjacent grooves 111*a* is the same as the distance between any two other adjacent grooves 111*a*. It should be appreciated, however, that the bearing surface 110*a* may include any number of grooves, which may have any suitable size, orientation (e.g., horizontal), configuration (e.g., spiral, arcuate, etc.), and combinations thereof.

Figure 1D:
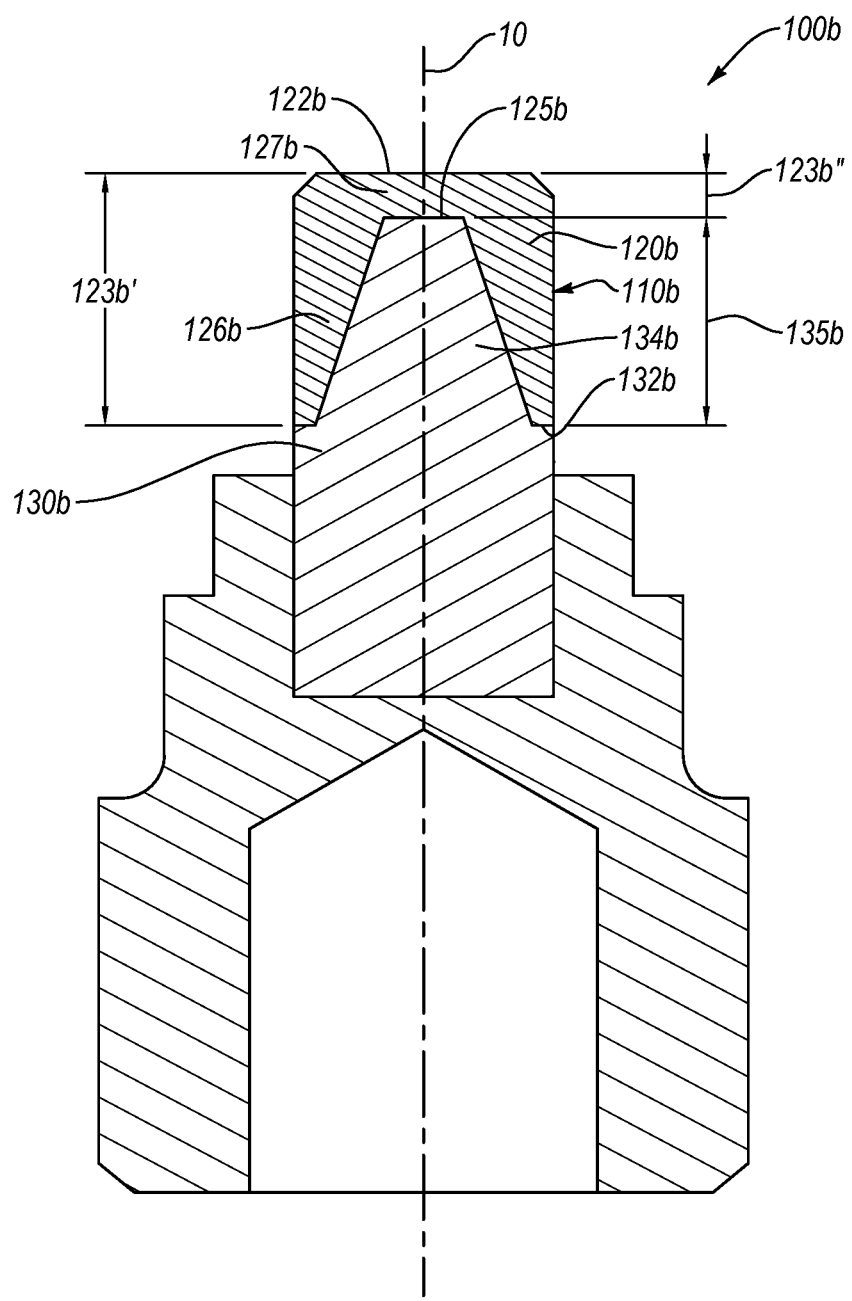
FIG. 1D is a cross-sectional view of a first bearing assembly including a superhard body and a substrate with a non-planar interface therebetween according to an embodiment.

The first bearing assembly may include a non-planar interface between the superhard body and the substrate. For example, as illustrated in the embodiment shown in FIG. 1D, the first bearing assembly 100*b* may include a non-planar interface 125*b* between the superhard body 120*b* and the substrate 130*b*. The non-planar interface 125*b* exhibits a three-dimensional geometry. The non-planar interface 125*b* may allow the superhard body 120*b* to exhibit one or more of a greater maximum thickness (e.g., at a peripheral surface thereof), increase a surface area of the first radial-bearing surface 110*b*, improve the bonding between the superhard body 120*b* and the substrate 130*b*, decrease the cost of the superhard body 120*b*, or increase thermal dissipation from the superhard body 120*b* than if the interface between the superhard body 120*b* and the substrate 130*b* was substantially planar. Additionally, the non-planar interface 125*b* may influence a nature, a magnitude, or a characteristic of residual stresses within the superhard body 120 and/or the substrate 130. Except as otherwise described below, the first bearing assembly 100*b* and its materials, elements, and components may be similar to or the same as the materials, elements, or components of the first bearing assembly 100, 100*a* (FIGS. 1A-1C).

The non-planar interface 125*b* causes the superhard body 120*b* to exhibit a thickness (measured from the top surface 122b to the non-planar interface 125b) that varies. For example, the superhard body 120b can include a first peripheral portion 126b and a second central portion 127b that collectively at least partially define the nonplanar interface 125b. The first peripheral portion 126b can extend from the second central portion 127b and away from the top surface 122b (e.g., a substantially planar top surface 122b). The first peripheral portion 126b exhibits a first thickness 123b' (e.g., maximum thickness of the first portion 126b) and the second portion 127b exhibit a second thickness 123b" (e.g., maximum thickness of the second portion 127b) that is less than the first thickness 123b'. The first thickness 123b' can be greater than about 0.12 inches, such as about 0.12 inches to about 0.2 inches, about 0.15 inches to about 0.25 inches, about 0.2 inches to about 0.3 inches, about 0.25 inches to about 0.5 inches, about 0.25 inches, or greater than about 0.5 inches. The second thickness 123b" can be less than about 0.15 inches, such as about 0.09 inches to about 0.15 inches, about 0.08 inches to about 0.12 inches, about 0.05 inches to about 0.09 inches, less than about 0.05 inches, or less than about 0.08 inches. In an embodiment, the first peripheral portion 126b may be located at and/or near the first radial-bearing surface 110b and the second central portion 127b can be remote from the first radial-bearing surface 110b. It should be noted that the superhard body 120b may exhibit any of the disclosed first thicknesses 123b' combined with any of the disclosed second thicknesses 123b". In an embodiment, the superhard body 120b may also include one or more additional portions (e.g., a third portion, a fourth portion, etc.) that each exhibit a thickness that is less and/or greater than the first thickness 123b' and less and/or greater than the second thickness 123b".

The substrate 130b can include one or more complementary features that conform to the portions of the superhard body 120b (e.g., first and second portions 126b, 127b). For example, the substrate 130b can at least partially define a recess 132b that is configured to receive the first portion 126b and a protrusion 134b that is configured to be received by a recess of the superhard body 120b (e.g., the recess that is at least partially defined by the first and second portions 126b, 127b). The substrate 130b may also include additional features (e.g., additional recesses, surface textures, surface grooves, and/or additional protrusions) that are complementary to the additional portions of the superhard body 120b. In an embodiment, each of the portions of the superhard body 120b (e.g., the first and second portions 126b, 127b) and each of the features of the substrate 130b (e.g., the recess 132b and the protrusion 134b) may be generally aligned with the axis 10.

In an embodiment, the first peripheral or second central portion 126b, 127b can extend angularly or in a non-angularly manner about the axis 10. In an embodiment, the first peripheral and second central portions 126b, 127b of the superhard body 120b may at least partially form a convex shape that at least partially defines a recess. The convex shape can exhibit any suitable shape, such as a generally cylindrical concave shape, a generally conical concave shape, a truncated generally concave conical shape, a generally concave frustum shape, a generally concave frusto-conical shape, a generally concave rectangular box shape, a generally concave cubic shape, a generally concave prism shape, a truncated generally concave prism shape, etc. In such an embodiment, the protrusion 134b of the substrate 130b may have a complementary convex shape (e.g., a generally convex cylindrical shape, a generally convex conical shape, a truncated generally convex conical shape, a generally convex rectangular box shape, a generally convex cubic shape, a generally convex prism shape, a truncated generally convex prism shape, etc.) relative to the recess of the superhard body 120b. A height 135b of the protrusion 134b may be at least about 0.1 inches, about least about 0.12 inches, at least about 0.125 inches, about 0.12 inches to about 0.2 inches, about 0.15 inches to about 0.25 inches, about 0.2 inches to about 0.3 inches, about 0.25 inches to about 0.5 inches, about 0.25 inches, or greater than about 0.5 inches. In an embodiment, the height 135b can be less than about 0.1 inches.

Figure 2A:
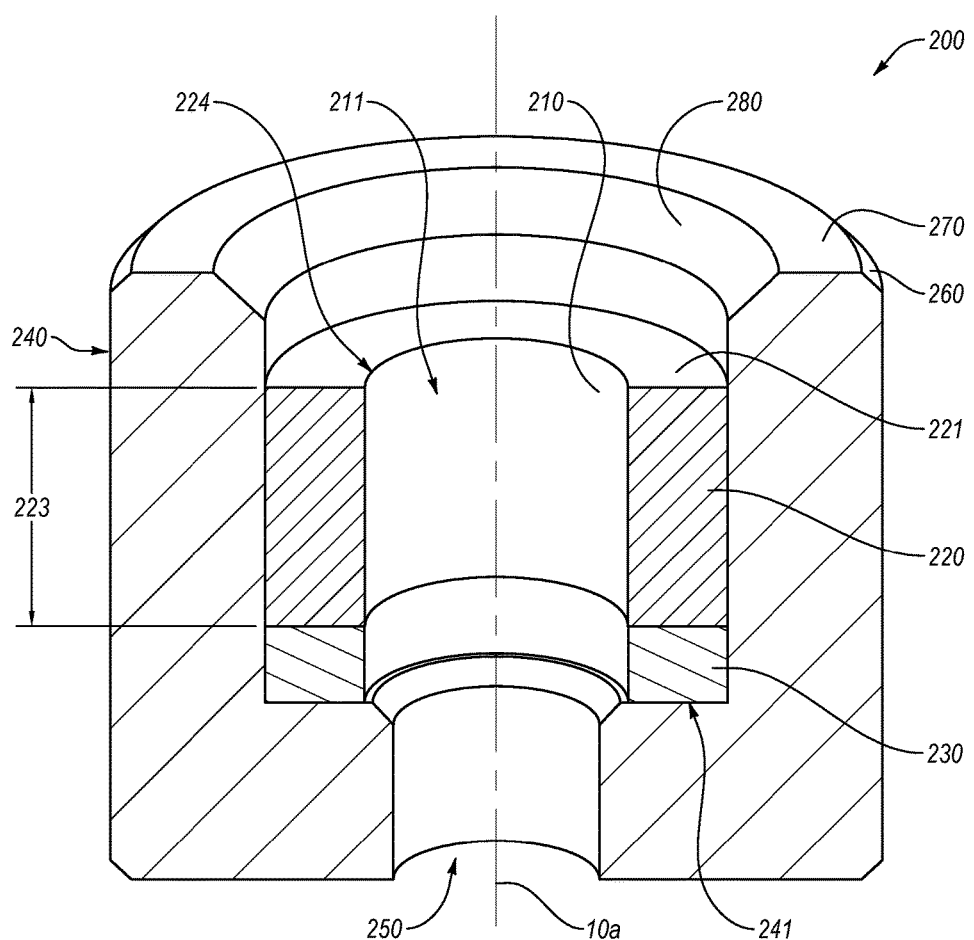
FIG. 2A is a cross-sectional view of a second bearing assembly according to an embodiment.

As mentioned above, the first bearing assembly 100 may rotatably engage the second bearing assembly. FIG. 2A illustrates an embodiment of a second bearing assembly 200. Generally, except as otherwise described below, the second bearing assembly 200 and its materials, elements, and components may be similar to or the same as materials, elements, or components of the first bearing assembly 100 (FIGS. 1A and 1B). In some embodiments, a superhard body 220 and/or a substrate 230 of the second bearing assembly 200 may include materials similar to or the same as the superhard body 120 and substrate 130, respectively. Also, in one example, the second bearing assembly 200 may include a second radial-bearing surface 210, which may engage the first radial-bearing surface 110 (FIGS. 1A and 1B). Embodiments may include the superhard body 220 that may form or define the second radial-bearing surface 210. The superhard body 220 may be bonded to the substrate 230, which may be secured to a support structure 240.

The second radial-bearing surface 210 may have a concave and approximately cylindrical shape that may span about an axis 10a in a manner that defines an opening in the second bearing assembly 200. Particularly, the cylindrical shape of the second radial-bearing surface 210 may at least partially engage the corresponding first radial-bearing surface of the first bearing assembly. In other words, the protruding superhard body that may form/define the first radial-bearing surface may be positioned at least partially within an opening 211 in the second bearing assembly 200 and the first radial-bearing surface may at least partially contact the second radial-bearing surface 210. In some instances, the opening 211 may have an approximately cylindrical shape, such as to define an inside diameter 224.

When at least partially engaged, the first radial-bearing surface and the second radial-bearing surface 210 may be substantially concentric with each other, such that the axis 10a is generally aligned with the axis 10 (FIGS. 1A and 1B). In any event, the first radial-bearing surface 110 (FIGS. 1A and 1B) may at least partially contact the second radial-bearing surface 210, such that the second bearing assembly 200 and the first bearing assembly may rotate relative to each other with limited relative lateral movement. In some embodiments, the second radial-bearing surface 210 may be substantially continuous. Alternatively, the second radial-bearing surface 210 may have grooves or other interruptions (e.g., to supply fluid between the second radial-bearing surface 210 and the first radial-bearing surface).

In an embodiment, the support structure 240 may have an approximately cylindrical shape. Furthermore, the support structure 240 may include a recess 241 that may secure the superhard body 220 and/or the substrate 230 therein. The superhard body 220 and/or substrate 230 may be press-fitted, brazed, fastened, or otherwise secured in the recess 241. Moreover, the second bearing assembly 200 may include the superhard body 220 that is substrateless, which may be bonded or otherwise secured directly to the support structure 240. In any event, the superhard body 220 may be secured to the support structure 240 and may have a suitable shape and size that may allow the first radial-bearing surface to at least partially enter the opening 211 formed in the superhard body 220 as well as at least partially contact the second radial-bearing surface 210. In another embodiment, the substrate 230 may be an annular substrate (e.g., ring-shaped) that is attached to the support structure 240 and the superhard body 220 may be received by and bonded with the annular substrate.

As shown in FIG. 2A, the second bearing assembly 200 may include a through hole 250. In some instances, the through hole 250 may allow fluid (e.g., drilling fluid) to enter and/or exit the second bearing assembly 200. For instance, the through hole 250 may be in fluid communication with the opening 211 defined by the second radial-bearing surface 210. Furthermore, any debris or dust generated during operation of the second bearing assembly 200 and the first bearing assembly may exit through the through hole 250, which may reduce wear of the second radial-bearing surface 210 and/or of the first radial-bearing surface. Moreover, the through hole 250 may include a female thread, which may be accept a fastener that may secure the second bearing assembly 200 to a machine element or component.

In some instances, the second bearing assembly 200 may include a chamfer 260 extending between a peripheral surface thereof and a top surface 270. Additionally or alternatively, the second bearing assembly 200 may include a second chamfer or lead-in 280, which may extend between the top surface 270 and a peripheral surface of the recess 241. The chamfer 260 and/or lead-in 280 may reduce or eliminate chipping or breaking of otherwise sharp corners or edges of the second bearing assembly 200.

In an embodiment, the top surface of the superhard body 220 also may form/define a thrust-bearing surface 221, which may at least partially contact the thrust-bearing surface of the first bearing assembly to limit or prevent relative axial movement of the first and second bearing assemblies. Hence, in one or more embodiments, the thrust-bearing surface 221 may include superhard material, such as polycrystalline diamond. The superhard body 220 may exhibit a thickness 230 measured from the thrust-bearing surface 221 to the substrate 230. The thickness 230 can be any of the thicknesses disclosed herein.

Figure 2B:
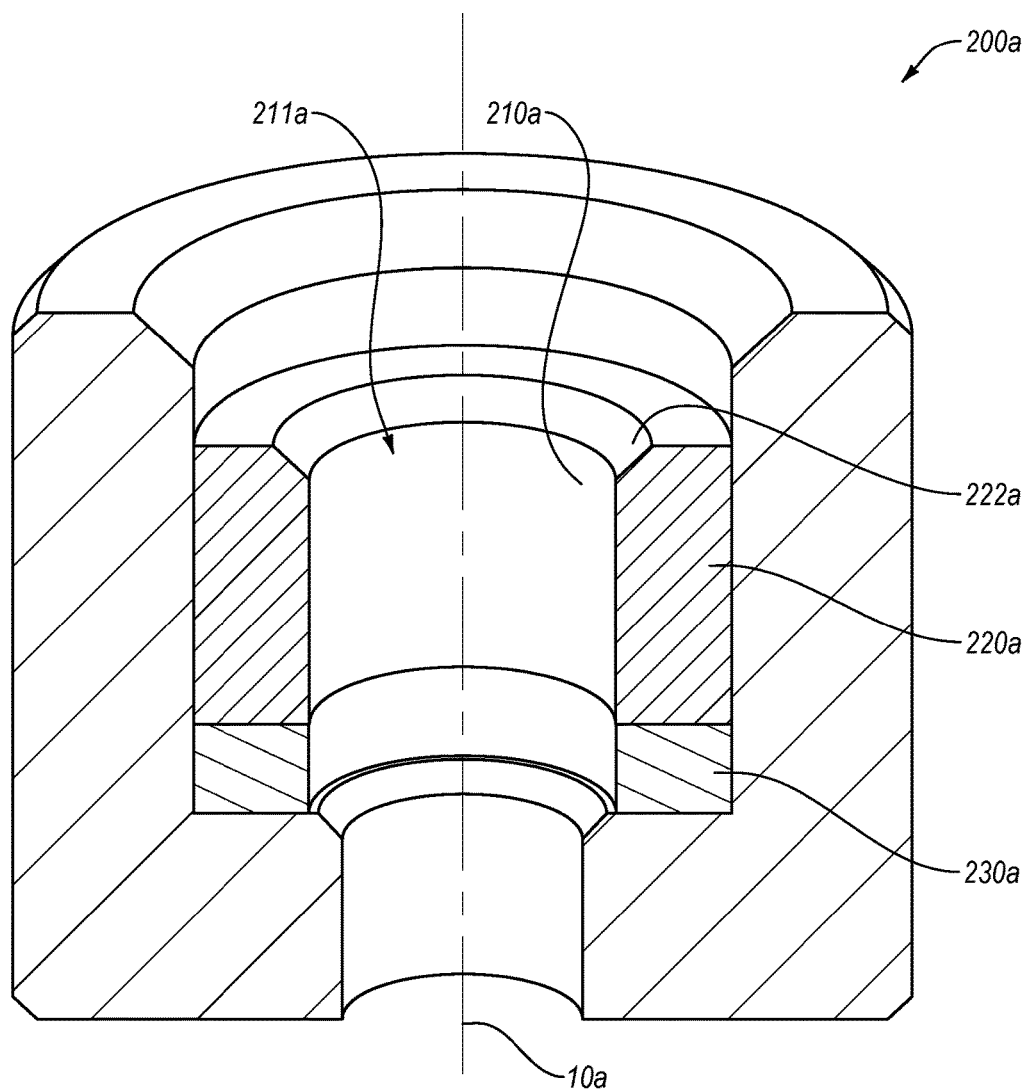
FIG. 2B is a cross-sectional view of a second bearing assembly according to another embodiment.

In some embodiments, the superhard body may include a chamfer to prevent chipping or cracking thereof during assembly and/or operation. For instance, FIG. 2B illustrates a second bearing assembly 200a that includes a superhard body 220a, which has a bearing surface 210a, and which may be bonded to a substrate 230a. Except as otherwise described herein, the second bearing assembly 200a and its materials, elements, and components may be similar to or the same as materials, elements, or components of the second bearing assembly 200 (FIG. 2A). In an embodiment, the superhard body 220a may include a chamfer 222a, which may be positioned at the top of an opening 211a defined by the bearing surface 210a.

Figure 2C:
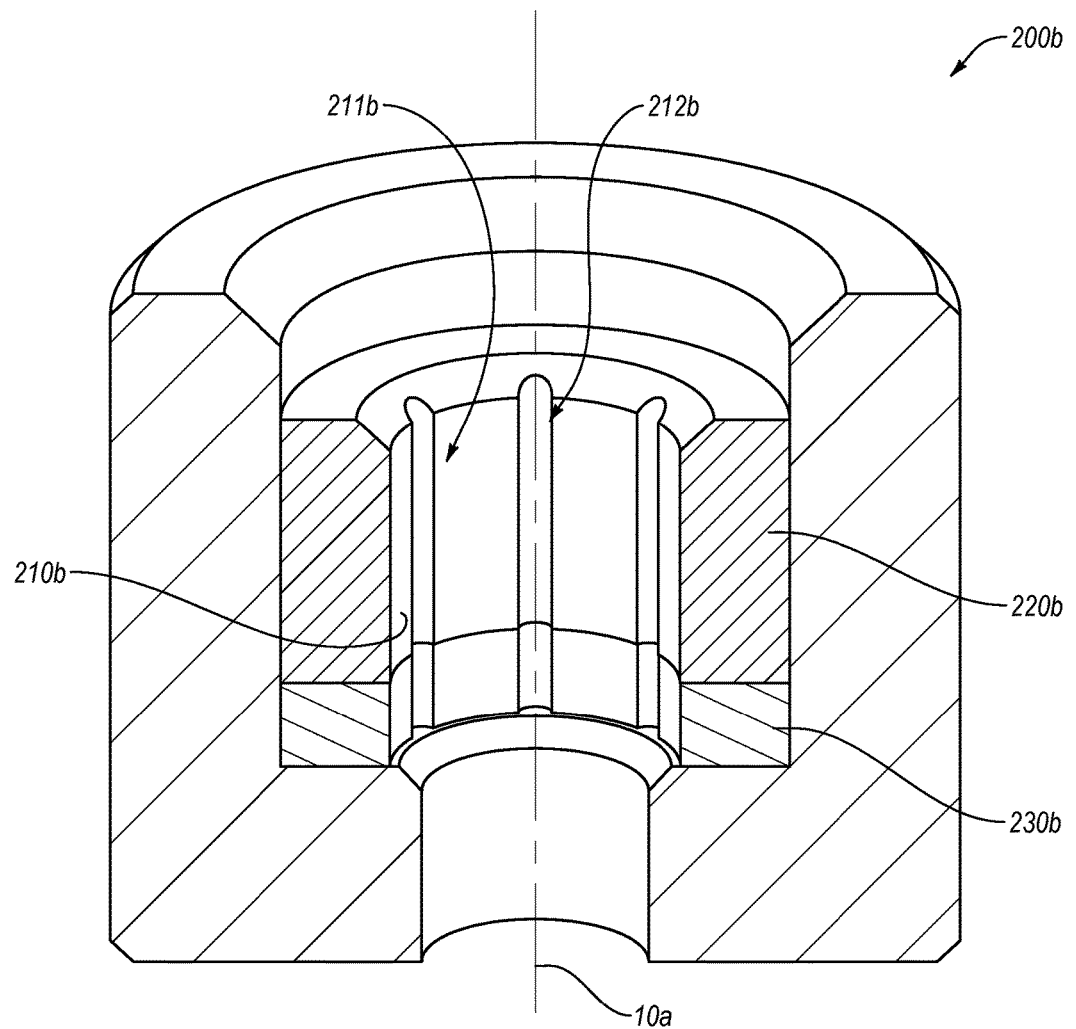
FIG. 2C is a cross-sectional view of a second bearing assembly according to yet another embodiment.

In additional or alternative embodiments, the second bearing assembly may include grooves, which may be similar to or the same as the grooves of the first bearing assembly. For example, FIG. 2C illustrates a second bearing assembly 200b that has a superhard body 220b that forms or defines a bearing surface 210a, and which includes a plurality of grooves 212b. Except as otherwise described herein, the second bearing assembly 200b and its materials, elements, and components may be similar to or the same as materials, elements, or components of any of the second bearing assemblies 200, 200a (FIGS. 2A and 2B). In some embodiments, the grooves 212b may extend into and through a substrate 230b. Accordingly, for example, fluid may flow through the groove 212b and into and/or out of an opening 211b of the second bearing assembly 200b. Moreover, it should be appreciated, however, that the bearing surface 210b may include any number of grooves, which may have any suitable size, orientation (e.g., horizontal), configuration (e.g., spiral, arcuate, etc.), and combinations thereof.

Figure 3A:
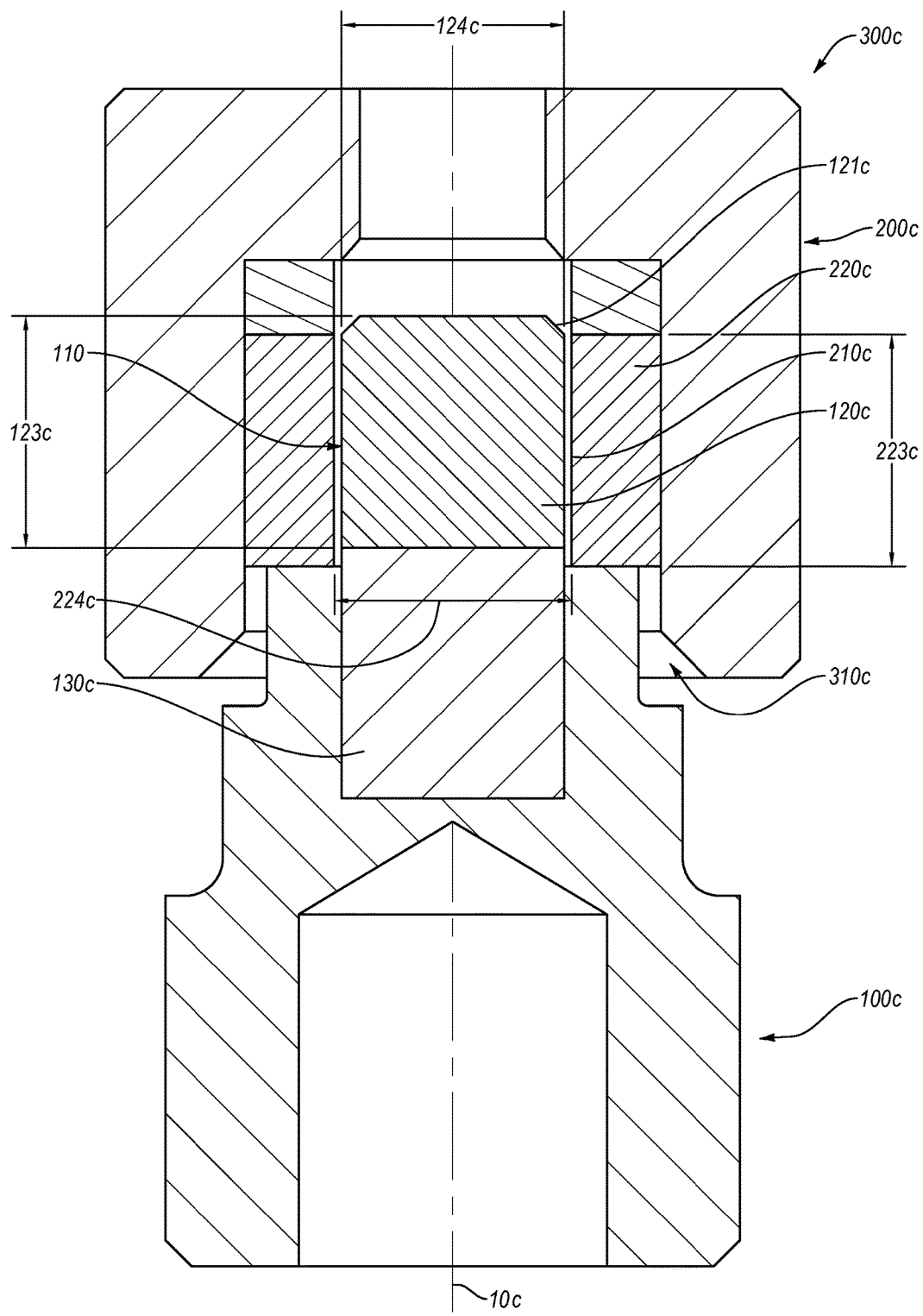
FIG. 3A is a cross-sectional view of a bearing apparatus according to an embodiment.

As noted above, the first and second bearing assemblies rotate with respect to one another, wherein the first radial-bearing surface and the second radial-bearing surface 210 at least partially contact one another. FIG. 3A illustrates an embodiment of a bearing apparatus 300c that includes the first bearing assembly 100c and second bearing assembly 200c assembled with one another. Except as otherwise disclosed herein, the first bearing assembly 100c and its materials, elements, and components may be similar to or the same as materials, elements, or components of any of the first bearing assemblies 100, 100a, 100b (FIGS. 1A-1D). Except as otherwise disclosed herein, the second bearing assembly 200c and its materials, elements, and components may be similar to or the same as materials, elements, or components of any of the second bearing assemblies 200, 200a, 200b (FIGS. 2A-2C).

In some embodiments, the first bearing assembly 100c may be a rotor, while the second bearing assembly 200c may be a stator. Alternatively, the first bearing assembly 100c may be a stator, while the second bearing assembly 200c may be a rotor (e.g., the second bearing assembly 200c may be attached to the shaft). Furthermore, in an embodiment, both the first bearing assembly 100c and the second bearing assembly 200c may rotate relative to a machine or mechanism incorporating the bearing apparatus 300c. In any case, the first bearing assembly 100c and second bearing assembly 200c may rotate relative to one another.

Particularly, the superhard body 120c may be positioned at least partially within the opening in the second bearing assembly 200c defined by the superhard body 220c. As mentioned above, the superhard body 220c and the superhard body 120c may at least partially contact one another, thereby providing a rotatable bearing between the first bearing assembly 100c and the second bearing assembly 200c. In some embodiments, diameter 124c of the superhard body 120c may be sufficiently small to accommodate compact spaces. For instance, the diameter 124c of the superhard body 120c may be in one or more of the following ranges: about 0.08 inches to 0.15 inches; about 0.10 inches to 0.20 inches; about 0.18 inches to about 0.38 inches; about 0.30 inches to 0.50 inches; about 0.40 inches to 0.80 inches; less than 2 inches; or less than 1 inch. In some instances, the diameter 124c of the superhard body 120c may be smaller than 0.08 inches or greater than 0.80 inches.

Similarly, the superhard body 120c may have a suitable thickness 123c, which may vary from one embodiment to another. For example, the thickness 123c of the superhard body 120c may be in one or more of the following ranges: about 0.05 inches to about 0.09 inches; about 0.08 inches to about 0.12 inches; about 0.09 inches to about 0.15 inches; about 0.15 inches to about 0.25 inches; less than 0.15 inches; less than 0.20 inches; or less than 0.50 inches. It should be appreciated that in some embodiments, the thickness 123c may be less than 0.05 inches or greater than 0.50 inches.

As mentioned above, the second radial-bearing surface 210c may define an opening that is sufficiently shaped and sized to accept and at least partially contact the first radial-bearing surface 110c during operation (e.g., the opening may have the diameter 224c). Furthermore, in some embodiments, the bearing apparatus 300c may include a clearance or a gap between the first radial-bearing surface 110c and the second radial-bearing surface 210c (measured by the difference between the outside diameter defined by the first radial-bearing surface 110c and inside diameter defined by the second radial-bearing surface 210c). For example, the gap between the first radial-bearing surface 110c and the second radial-bearing surface 210c may be in one or more of the following ranges (provided as a percentage of the diameter defined by the first radial-bearing surface 110c): about 0.5% to 1.0%; about 0.8% to 1.5%; about 1.2% to 2.5%; about 2% to 3%; or about 2.7% to 3.5%. In some instances, the gap between the first radial-bearing surface 110c and the second radial-bearing surface 210c may be less than 0.5% or greater than 3.5% of the diameter defined by the first radial-bearing surface 110c. In a specific embodiment, the first radial-bearing surface 110c may define an outside diameter of about 0.249 inches, while the second radial-bearing surface 210c may define an inside diameter of about 0.256 inches, forming a gap of about 0.007 inches.

Although the gap of about 0.007 inches may be atypical for radial bearing assemblies, such gap may facilitate development of fluid film between the first radial-bearing surface 110c and the second radial-bearing surface 210c, thereby producing a hydrodynamic operation of the bearing apparatus 300c. In some instances, the fluid may be introduced between the first radial-bearing surface 110c and the second radial-bearing surface 210c through a space 310c between the first bearing assembly 100c and the second bearing assembly 200c. Alternatively, the fluid may be introduced through the through hole 250c in the second bearing assembly 200c. It should be also appreciated that the fluid may be introduced between the first radial-bearing surface 110c and second radial-bearing surface 210c in any number of suitable ways, which may vary from one embodiment to the next. Additionally, in some embodiments the drilling fluid may be channeled to enter the space between the first radial-bearing surface 110c and second radial-bearing surface 210c and may form the fluid film, which may facilitate hydrodynamic operation of the bearing apparatus 300c.

In some embodiments, a portion of the substrate 130c may be positioned at least partially within the opening defined by the second radial-bearing surface 210c. Alternatively, the substrate 130c may be outside of or above the opening formed by the second radial-bearing surface 210c and may not contact the second radial-bearing surface 210c during operation of the bearing apparatus 300c. Accordingly, the substrate 130c may not experience wear during operation of the bearing apparatus 300c.

In addition, as mentioned above, the chamfer 121c may prevent the superhard body 120c from chipping and/or cracking during the operation of the bearing apparatus 300c. Moreover, in some embodiments, the chamfer 121c may start below the second radial-bearing surface 210c. As such, in some embodiments, the entire first radial-bearing surface 110c may be in contact with the second radial-bearing surface 210c.

Figure 3B:
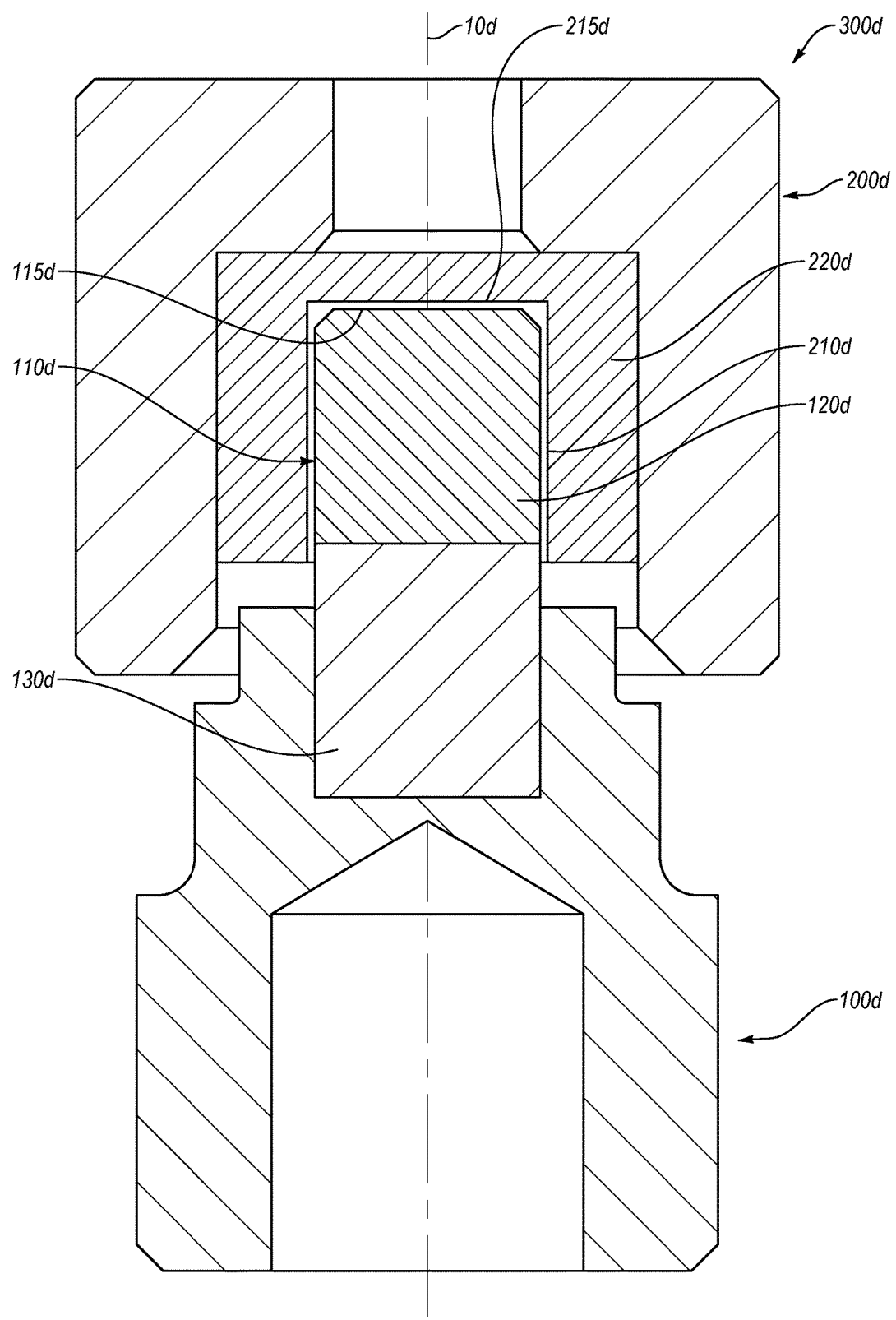
FIG. 3B is a cross-sectional view of a bearing apparatus according to another embodiment.

In some embodiments, the bearing apparatus may carry both a radial load and a thrust load. For instance, as illustrated in FIG. 3B, a bearing apparatus 300d may include opposing thrust-bearing surfaces 115d, 215d of first and second bearing assemblies 100d, 200d. Except as otherwise described herein, materials, elements, or components of the bearing apparatus 300d may be similar to or the same as materials, elements, or components of the bearing apparatus 300c (FIG. 3A). For instance, the first and second bearing assemblies 100d, 200d also may include radial bearing surfaces 110d, 210d that may carry the radial load exerted onto the bearing apparatus 300d.

Moreover, in an embodiment, both the thrust-bearing surface 115d and the radial bearing surface 110d may be formed by the same superhard body 120d of the first bearing assembly 100d. In an embodiment, the superhard body 120d may be bonded to a substrate 130d. The thrust-bearing surface 215d and the radial bearing surface 210d of the second bearing assembly 200d may be formed/defined by a superhard body 220d. In some instance, the superhard body 220d may be bonded directly to a support structure 240d.

Figure 3C:
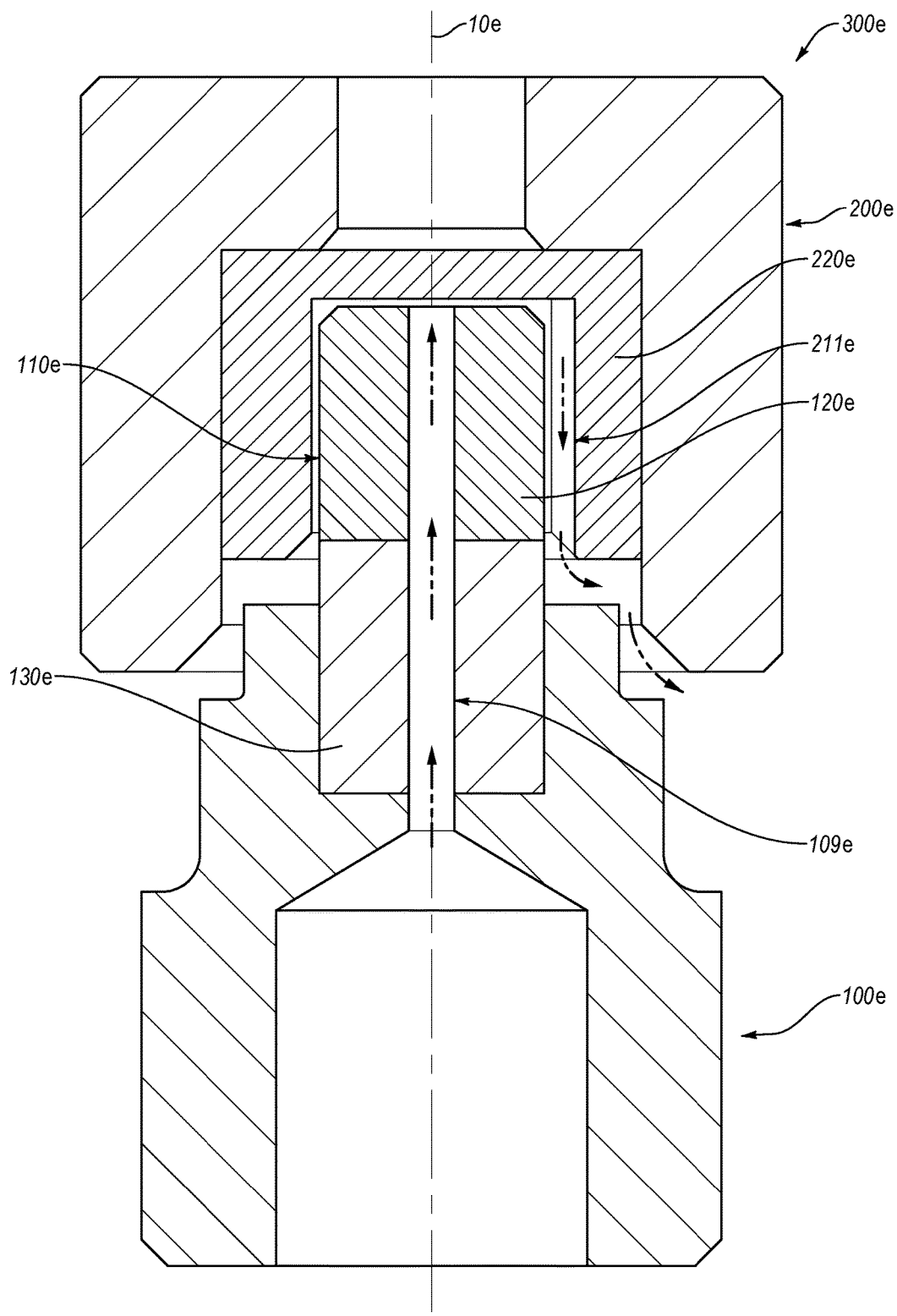
FIG. 3C is a cross-sectional view of a bearing apparatus according to yet another embodiment.

As noted above, bearing surfaces of the first and/or second bearing assembly may include one or more grooves therein. For example, FIG. 3C illustrates a bearing apparatus 300e that includes a first bearing assembly 100e and a second bearing assembly 200e, either or both of which may include grooves in the bearing surfaces thereof. In particular, an embodiment includes grooves 211e in a superhard body 220e of the second bearing assembly 200e. Except as otherwise described herein, materials, elements, or components of the bearing apparatus 300e may be similar to or the same as materials, elements, or components of the bearing apparatus 300c, 300d (FIGS. 3A-3B). It should be also appreciated that, in one or more embodiments, the first bearing assembly 100e also may include grooves in the bearing surface thereof (e.g., as described above in connection with FIG. 1C).

In any event, fluid may be circulated through one or more grooves in the bearing surfaces of the second bearing assembly 200e and/or in the first bearing assembly 100e. Providing fluid flow through the grooves 211e may produce hydrodynamic operation of the bearing apparatus 300e. For example, the fluid may be directed through the first bearing assembly 100e and into the second bearing assembly 200e (e.g., into the grooves 211e of the second bearing assembly 200e). In an embodiment, the first bearing assembly 100e may include an opening 109e, which may pass through the first bearing assembly 100e (e.g., through substrate 130e and/or through superhard body 120e of the first bearing assembly 100e). Particularly, the opening 109e may be in fluid communication with the grooves 211e, and the fluid may pass through the opening 109e and into the grooves 211e.

Figure 3D:
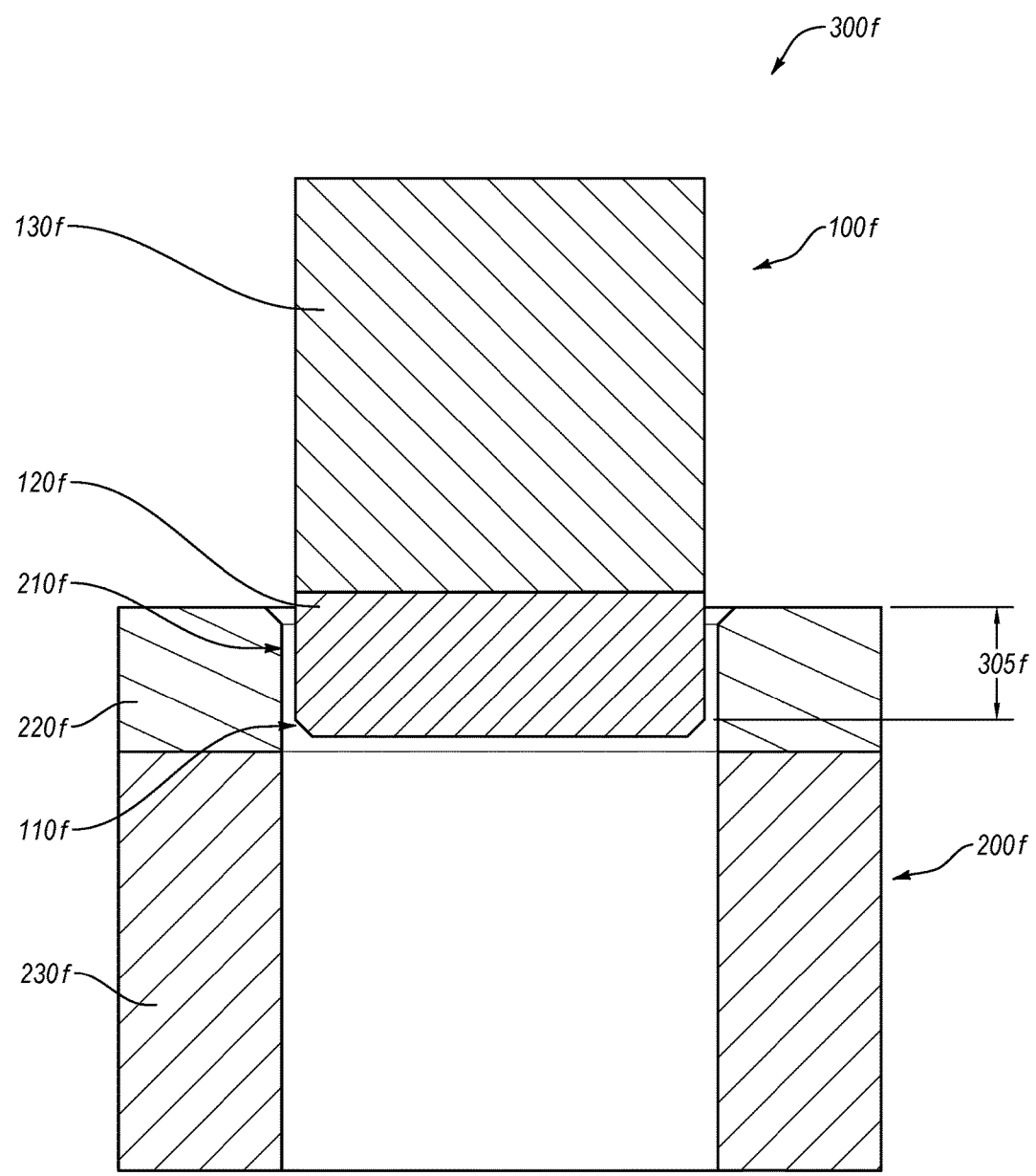
FIG. 3D is a cross-sectional view of a bearing apparatus according to still one other embodiment.

While the bearing assemblies and bearing apparatuses described above may include support structures, it should be appreciated that this invention is not so limited. For instance, FIG. 3D illustrates an embodiment of a bearing apparatus 300f that includes a first bearing assembly 100f and a second bearing assembly 200f assembled with one another, either or both of which may not include a support structure. Except as described herein, material, elements, or components of the bearing apparatus 300f may be similar to or the same as materials, elements, or components of any of the bearing apparatuses 300c, 300d, 300e (FIGS. 3A-3C).

In some embodiments, the first bearing assembly 100f may include a superhard body 120f bonded to a substrate 130f, which may be substantially cylindrical. The first bearing assembly 100f may be secured to or otherwise incorporated directly into moving (e.g., rotating) or stationary machine component. Likewise, the second bearing assembly 200f may include a hollow cylindrical or tubular superhard body 220f that may be bonded to a substrate 230f. In some instances, the substrate 230f also may be at least partially tubular. The second bearing assembly 200f also may be directly attached to or incorporated into a moving (e.g., rotating) or stationary machine component. In any event, at least a portion of the superhard body 120ƒ may enter the opening in the superhard body 220ƒ.

Moreover, a bearing surface 110ƒ of the first bearing assembly 100ƒ may engage a corresponding bearing surface 210ƒ of the second bearing assembly 200ƒ. For example, the bearing surfaces 110ƒ and 210ƒ may have an overlap 305ƒ therebetween. In other words, the bearing surfaces 110ƒ and 210ƒ may engage or at least partially contact each other along the overlap 305ƒ. For example, the overlap 305ƒ may be greater than or less than 0.50 inches, such as 0.3 inches to about 0.7 inches, 0.2 inches to about 0.35 inches, or about 0.15 inches to about 0.30 inches.

Figure 4:
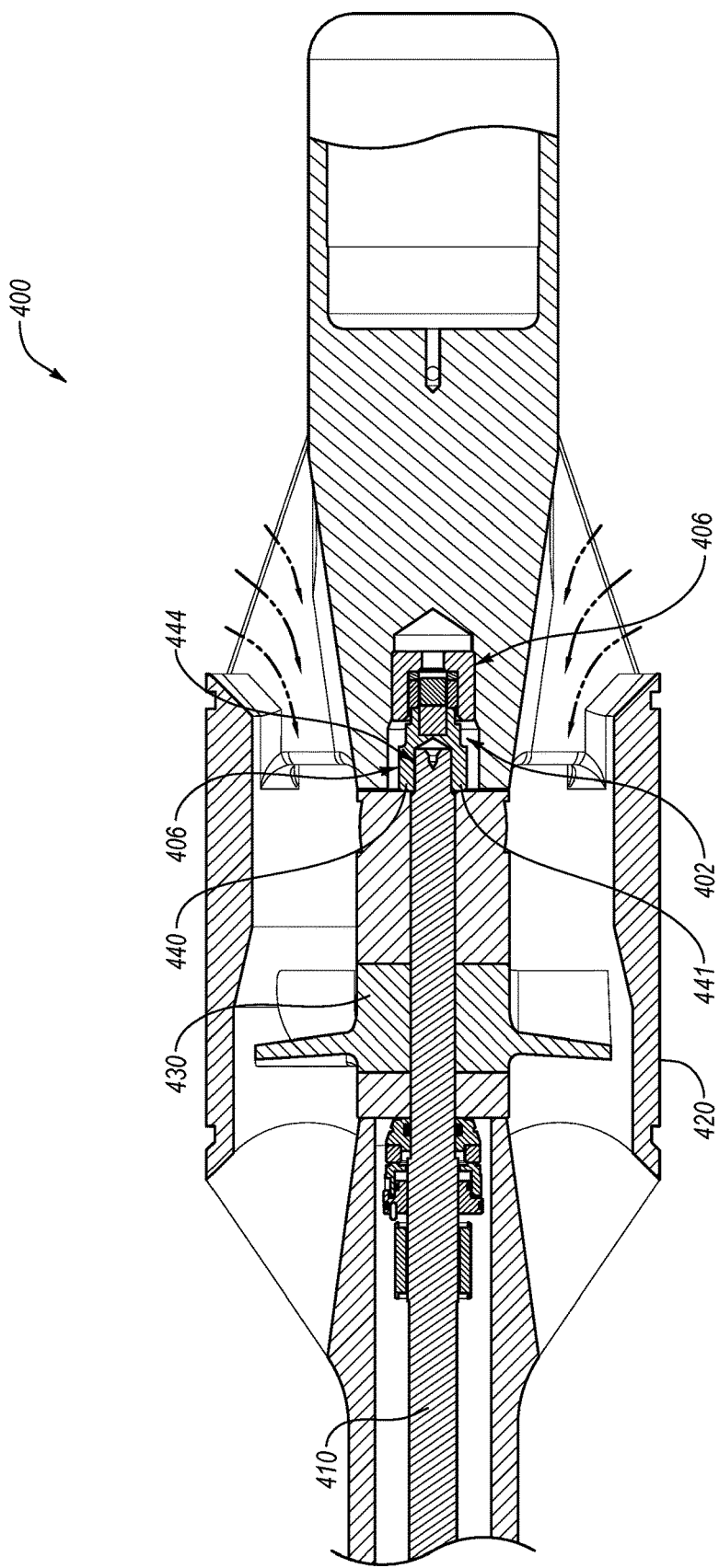
FIG. 4 is a partial cross-sectional view of a power generation unit according to an embodiment.

Any of the bearing apparatuses disclosed herein may be incorporated into any number of machines or mechanisms to rotatably secure rotating components or elements thereof. FIG. 4 illustrates an embodiment of a power generation unit 400 that includes the bearing apparatus 402. In particular, the bearing apparatus 402 (e.g., any of the bearing apparatuses 300c, 300d, 300e, 300ƒ of FIGS. 3A-3D) may rotatably connect a shaft 410 within a housing 420. For example, the second bearing assembly 404 (e.g., any of the second bearing assemblies 200, 200a, 200b of FIGS. 2A-2C) may be a stator and may be secured to and/or within the housing 420, such as to remain substantially stationary relative to the housing 420. The first bearing assembly 406 (e.g., any of the first bearing assemblies 100, 100a, 100b of FIGS. 1A-1D) may be a rotor and may be secured to the shaft 410 in a manner that allows the housing 420 to rotate within the shaft 410. In an embodiment, the shaft 410 may be secured within the section 441.

It should be appreciated that the first bearing assembly 406 may be attached to the shaft 410 in any number of suitable ways. In an embodiment, as noted above, the section 441 includes the opening 444 that may accept a portion of the shaft 410. Moreover, the opening 444 may position the first bearing assembly 406 relative to the shaft 410. For example, the opening 444 may align the first bearing assembly 406 relative to the shaft 410, such that the first bearing assembly 406 is concentric with the shaft 410. Accordingly, rotation of the shaft 410 about center axis there may produce rotation of the first bearing assembly 406 about an axis (e.g., axis 10 of FIGS. 1A-1D).

Furthermore, the shaft 410 may be secured within the opening 444. For example, the opening 444 may include female threads that may engage with male threads on an end of the shaft 410, thereby connecting the first bearing assembly 406 to the shaft 410. In some instances, the threads also may align the first bearing assembly 406 relative to the shaft, such that the first bearing assembly 406 is concentric with the shaft 410. Other fastening configurations (e.g., with screws) also may connect the first bearing assembly 406 to the shaft 410. In additional or alternative embodiments, the shaft 410 may be press-fitted into the opening 444 of the first bearing assembly 406. Likewise, the first bearing assembly 406 may be brazed, welded, or otherwise connected to or integrated with the shaft 410 (e.g., the support structure 440 of the first bearing assembly 406 may be integrated with the shaft 410). In any event, the first bearing assembly 406 may be attached or secured to the shaft 410 in a manner that rotation of the shaft 410 produces a corresponding rotation of the first bearing assembly 406 and vice versa.

The term "housing" is not intended to be limiting and is provided only as an example component of the power generation unit 406. It should be appreciated that the shaft may be rotatably connected to any element or component of a machine that may remain stationary relative to the shaft during operation of such machine. In other words, the housing 420 may be any other stationary element or component that may secure a stator of the bearing apparatus 402, which may be rotatably engaged with a rotor of the bearing apparatus 402.

In an embodiment, the power generation unit 400 may include a turbine 430 attached to the shaft 410. As fluid flows through the power generation unit 400 (as indicated by the arrows), the turbine 430 may be induced to rotate together with the shaft 410. In an embodiment, the housing 420 may include one or more openings, which may channel the fluid toward the turbine 430 and, subsequently, out of the power generation unit 400. The shaft 410 may be operably connected to an alternator in a manner that rotation of the shaft 410 may drive the alternator (e.g., the shaft 410 may include a magnetic rotor that may be surrounded by windings), thereby converting mechanical energy into electrical power. Additionally, a portion of the fluid may be diverted or may otherwise flow between the first bearing assembly 406 and second bearing assembly 404, as described above, thereby producing hydrodynamic operation of the bearing apparatus 402.

It should be appreciated that any of the bearing apparatuses 300, 300a, 300b, 300c (FIGS. 3A-3D) may be used in the power generation unit described above. Furthermore, even though the bearing apparatuses are described above as used in a power generation unit (e.g., in the power generation unit 400), the embodiments of the invention are not so limited. Hence, any of the bearing apparatuses 300, 300a, 300b, 300c (FIGS. 3A-3D) may be used in any suitable machine or mechanism to facilitate rotation of one or more elements or components thereof. For instance, any of the bearing apparatuses 300, 300a, 300b, 300c (FIGS. 3A-3D) may be used a blood pump, such as a cardiopulmonary bypass blood pump described in U.S. patent application Ser. No. 13/761,944, entitled "Bearing Assembly For Use In Axial-Flow Cardiopulmonary Bypass Blood Pumps And Related Pumps," filed on Feb. 7, 2013, the entire content of which is incorporated herein by this reference. For instance, any of the bearing apparatuses 300, 300a, 300b, 300c (FIGS. 3A-3D) may rotatably secure the shaft of the blood pump within and relative to the housing thereof.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A power generation unit, comprising:
   a shaft;
   a housing; and
   a bearing apparatus including:
      a first bearing assembly including:
         a first support structure substantially centered about an axis and including a top surface, the first support structure defining a recess positioned about the axis and extending inwardly from the top surface, the first support structure defining an opening configured to receive the shaft;
         a first substrate, wherein at least a portion of the first substrate is secured in the recess of the first support structure;
         a first superhard body substantially centered about the axis and bonded to the first substrate at an interface therebetween, the first superhard body protruding above the top surface of the support structure, the first superhard body defining a convex radial-bearing surface and a top surface that intersects the axis, at least a portion of the first superhard body exhibiting a thickness of about 0.25 inches to about 0.50 inches; and a second bearing assembly including a second superhard body including an opening defined by a concave radial-bearing surface, the concave radial bearing surface sized and configured to engage the convex radial-bearing surface of the first superhard body.

2. The power generation unit of claim 1, wherein the shaft is threadedly coupled to or press-fitted into the opening of the first support structure.

3. The power generation unit of claim 1, wherein the shaft is brazed or welded to the opening of the first support structure.

4. The power generation unit of claim 1, wherein the first superhard body is a unitary body.

5. The power generation unit of claim 1, wherein the first superhard body includes a first portion exhibiting a first thickness and a second portion exhibiting a second thickness that is less than the first thickness.

6. The power generation unit of claim 1, wherein the first superhard body includes a polycrystalline diamond body defining the convex radial-bearing surface, the top surface, and a volume enclosed by the convex bearing surface, the top surface, and the interface between the first superhard body and the first substrate.

7. The power generation unit of claim 1, wherein at least one of the first radial-bearing surface or the second radial-bearing surface is substantially continuous.

8. The power generation unit of claim 1, further comprising a turbine attached to the shaft.

9. The power generation unit of claim 8, wherein the housing defines one or more housing opening therein configured to channel fluid toward the turbine.

10. The power generation unit of claim 8, further comprising an alternator operably connected to the shaft.

11. A power generation unit, comprising:
a housing;
a shaft;
a turbine attached to the shaft; and
a bearing apparatus including:
    a first bearing assembly including:
        a first support structure substantially centered about an axis and including a top surface;
        a first substrate;
        a first superhard body substantially centered about the axis and bonded to the first substrate at an interface therebetween, the first superhard body protruding above the top surface of the support structure, the first superhard body defining a convex radial-bearing surface and a top surface that intersects the axis, at least a portion of the first superhard body exhibiting a thickness of about 0.2 inches to about 0.50 inches;
    a second bearing assembly including a second superhard body including an opening defined by a concave radial-bearing surface, wherein the concave radial bearing surface is sized and configured to engage the convex radial-bearing surface of the first superhard body; and
    the first support structure defines an opening configured to receive the shaft.

12. The power generation unit of claim 11, wherein the first superhard body is a unitary body.

13. The power generation unit of claim 11, wherein the first superhard body includes a polycrystalline diamond body defining the convex radial-bearing surface, the top surface, and a volume enclosed by the convex bearing surface, the top surface, and the interface between the first superhard body and the first substrate.

14. A power generation unit, comprising:
a shaft;
a housing defining a recess;
a bearing apparatus including:
    a first bearing assembly connected to or integrally formed with the shaft, the first bearing assembly including:
        a first support structure substantially centered about an axis and including a top surface;
        a first substrate;
        wherein the first support structure defines a recess positioned about the axis that includes at least a portion of the first substrate secured therein, the recess extending inwardly from the top surface;
        a first superhard body substantially centered about the axis and bonded to the first substrate at an interface therebetween, the first superhard body protruding above the top surface of the support structure, the first superhard body defining a convex radial-bearing surface and a top surface that intersects the axis, at least a portion of the first superhard body exhibiting a thickness of about 0.25 inches to about 0.50 inches; and
    a second bearing assembly including:
        a second support structure that is distinct from the housing and at least partially disposed in the recess of the housing;
        a second superhard body secured to the second support structure, the second superhard body including an opening defined by a concave radial-bearing surface, the concave radial bearing surface sized and configured to engage the convex radial-bearing surface of the first superhard body.

15. The power generation unit of claim 14, wherein the first support structure defines an opening configured to receive the shaft.

16. The power generation unit of claim 14, wherein the first superhard body is a unitary body.

17. The power generation unit of claim 14, wherein the first superhard body includes a polycrystalline diamond body defining the convex radial-bearing surface, the top surface, and a volume enclosed by the convex bearing surface, the top surface, and the interface between the first superhard body and the first substrate.

* * * * *